United States Patent

Jensen et al.

[11] Patent Number: 6,076,554
[45] Date of Patent: Jun. 20, 2000

[54] MULTIPORT PLUG VALVE WITH SELECTABLE PORT EXCLUSION

[75] Inventors: Robert M. Jensen, East Brunswick; Edward C. Teter, North Caldwell, both of N.J.

[73] Assignee: H-Tech, Inc., Wilmington, Del.

[21] Appl. No.: 09/320,313

[22] Filed: May 26, 1999

Related U.S. Application Data

[60] Provisional application No. 60/089,547, Jun. 17, 1998.

[51] Int. Cl.⁷ .................................................. F16K 11/076
[52] U.S. Cl. ...................................... 137/625.47; 251/285
[58] Field of Search ..................... 137/625.46, 625.47; 251/285, 288

[56] References Cited

U.S. PATENT DOCUMENTS

| | | |
|---|---|---|
| 388,748 | 8/1888 | Webb . |
| 825,706 | 7/1906 | Dyblie . |
| 1,053,327 | 2/1913 | Stebbins . |
| 1,067,549 | 7/1913 | Quigley . |
| 1,166,571 | 1/1916 | Bard . |
| 1,355,832 | 10/1920 | Heffernan . |
| 1,417,808 | 5/1922 | Dewey . |
| 1,444,899 | 2/1923 | Authier . |
| 1,590,794 | 6/1926 | Anderson . |
| 2,247,090 | 6/1941 | Jones et al. . |
| 2,374,516 | 4/1945 | Wendell . |
| 2,404,996 | 7/1946 | Thrush . |
| 2,598,148 | 5/1952 | Thrush . |
| 2,746,478 | 5/1956 | Johnson . |
| 2,755,814 | 7/1956 | Hedland . |
| 3,744,752 | 7/1973 | Massey . |
| 3,938,553 | 2/1976 | Ortega ................................ 137/625.47 |
| 4,044,789 | 8/1977 | Elmore . |
| 4,073,471 | 2/1978 | Lehtinen . |
| 4,470,429 | 9/1984 | Johnson . |
| 5,236,006 | 8/1993 | Platusick et al. ....................... 137/375 |

*Primary Examiner*—John Fox
*Attorney, Agent, or Firm*—Selitto & Associates

[57] ABSTRACT

A diverter valve includes a cup-shaped, substantially cylindrical body with a plurality of ports extending from the side of the body, each communicating with a hollow in the body. A disk shaped top is held in sealing engagement with the body. A plug is rotatably positioned within the body and seals against the body for closing a selected one of the plurality of ports. A portion of the plug extends through the top to permit the plug to be turned. A handle is coupled to the extending portion of the plug. The handle has an adjustable stop for limiting the rotation of the plug.

10 Claims, 5 Drawing Sheets

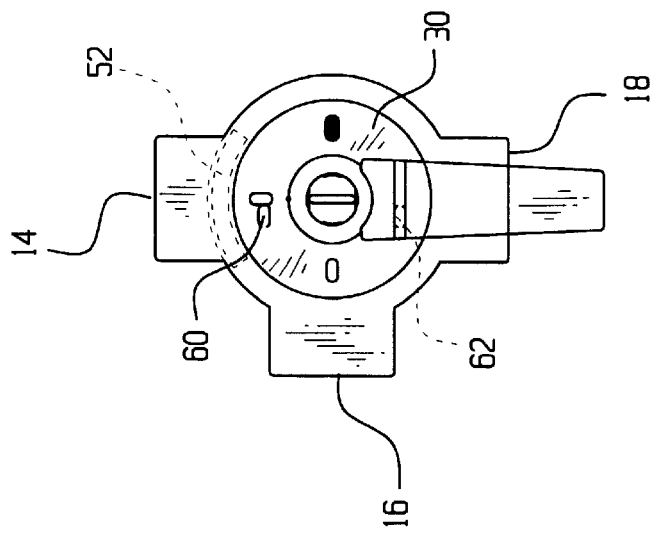
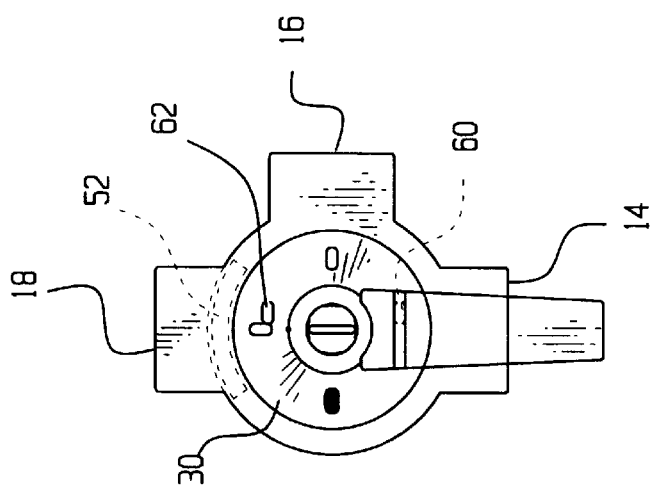
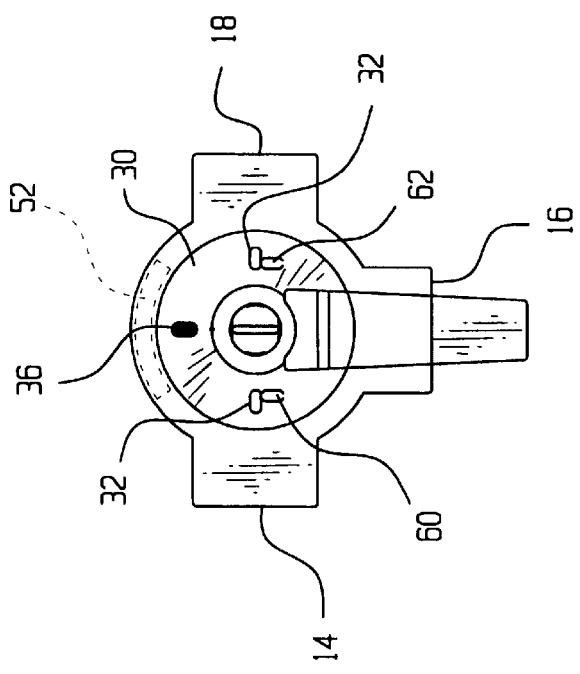

MULTIPORT PLUG VALVE WITH SELECTABLE PORT EXCLUSION

Cross Reference to Related Application

This is a §111(a) application relating to U.S. application Ser. No. 60/089,547 filed Jun. 17, 1998.

FIELD OF THE INVENTION

The present invention relates to plug valves for controlling fluid flow and more particularly to such valves having a plurality of ports with at least one port selectively excludable from closure.

BACKGROUND OF THE INVENTION

Plug valves have been known and used for many years for controlling and modulating the flow of fluids. U.S. Pat. No. 1,166,571 to Bard discloses a three port plug valve with a central key or plug (hereinafter "key") that may be rotated to occlude a selected port. Piping is connected to the various ports of the plug valve and by manipulating the key position, a fluid flowing through a first pipe may be selectively passed through the valve such that another of the connected pipes can be made to communicate with the first. The patent to Bard recognizes that in many applications, one port is dedicated to pressurized inlet flow such that it would be undesirable to occlude the inlet port. In this case, the valve directs the inlet flow to one of the other two remaining (outlet) ports depending upon the position of the key. To protect the inlet port from being occluded by the key, Bard utilizes stops internal or external to the valve. The external stop members act upon the handle of the valve which is attached to the shaft upon which the key rotates.

U.S. Pat. No. 4,470,429 to Johnson discloses another three-way valve which is similar to that of Bard, but which incorporates a symmetrical mounting cover and body adapted to permit the cover assembly to be rotated such that a stop member affixed to the cover can be positioned with respect to a selected port to prevent the occlusion of that port by the internal plug or key. The Johnson valve has a stop depending from a key position indicator on the handle that engages the stop on the cover. While the Johnson valve provides the desirable objective of selecting the port which is excluded from closure, in order to select a different inlet port, the valve must be disassembled, namely, by removing the screws affixing the top cover to the body of the valve and rotating the top cover such that the stop on the cover is aligned with the port which is to be protected by the stop. Accordingly, it would be desirable to provide a plug valve with selectable port exclusion that does not require disassembly and reassembly in order to select the excluded port.

SUMMARY OF THE INVENTION

The problems and disadvantages associated with conventional techniques and apparatus for controlling the position of a multi-port diverter valve plug are overcome by the present invention which includes a handle for positioning a rotatable shaft extending from a valve housing having a stop thereon. The handle has a hub releasably coupled to the shaft and a handgrip portion extending from the hub to facilitate applying manual torque to turn the shaft. An adjustable stop releasably coupled to the hub to rotate conjointly therewith is capable of assuming a plurality of angular orientations relative to the handgrip portion, and contacts the housing stop at least one point in the rotary travel of the handle to limit the range of motion of the shaft. The handle is particularly suitable for use in controlling the position of a multi-port diverter valve which requires one of the ports to be prevented from being blocked.

BRIEF DESCRIPTION OF THE SEVERAL VIEWS OF THE DRAWINGS

For a better understanding of the present invention, reference is made to the following detailed description of an exemplary embodiment considered in conjunction with the accompanying drawings, in which:

FIGS. 7 through 9 are diagrammatic views of the valve of FIG. 1 in different states and providing exclusion of each of the three ports of the valve.

DETAILED DESCRIPTION OF THE INVENTION

Figure 1:
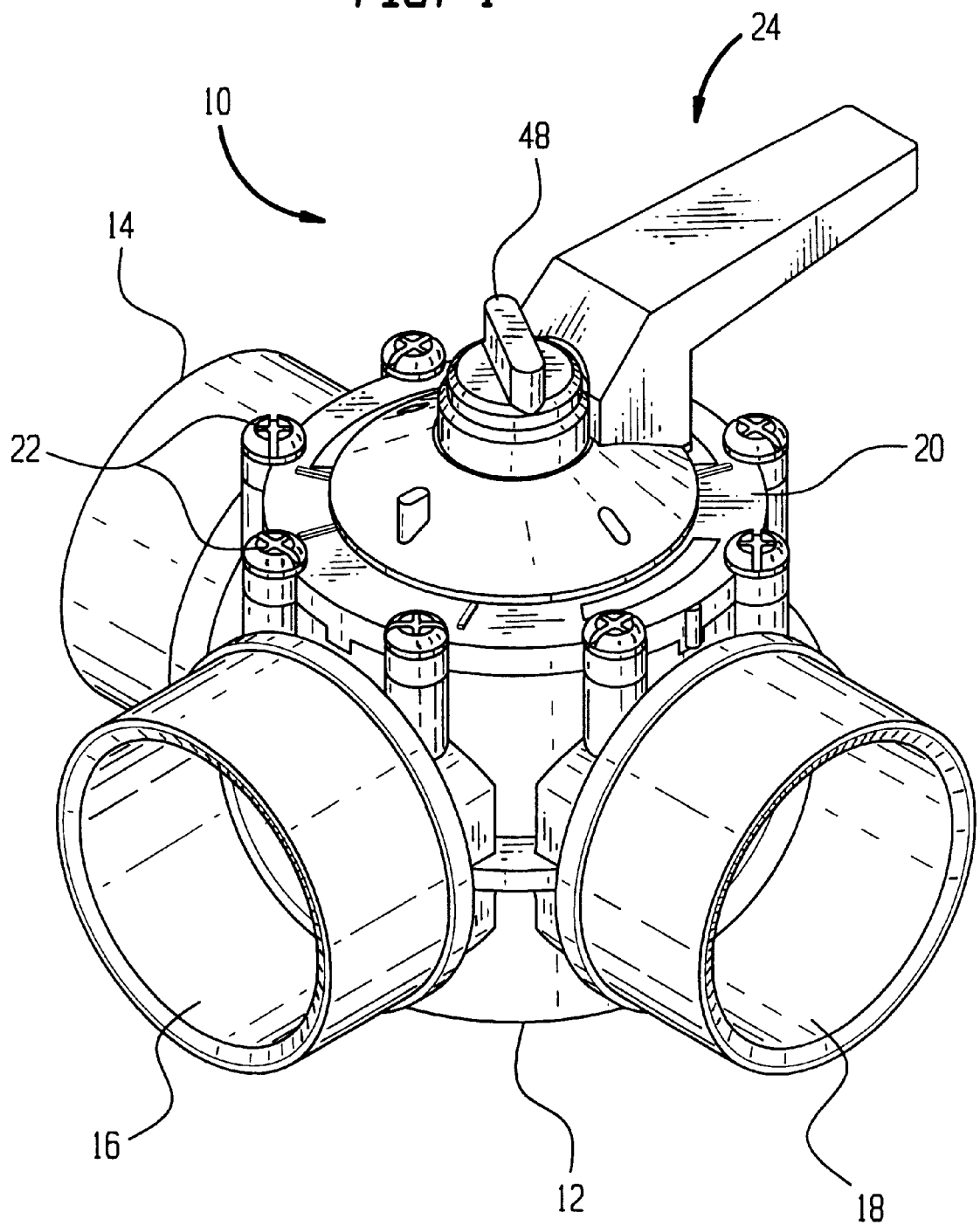
FIG. 1 is a perspective view of a multiport plug valve in accordance with an embodiment of the invention.
Figure 2:
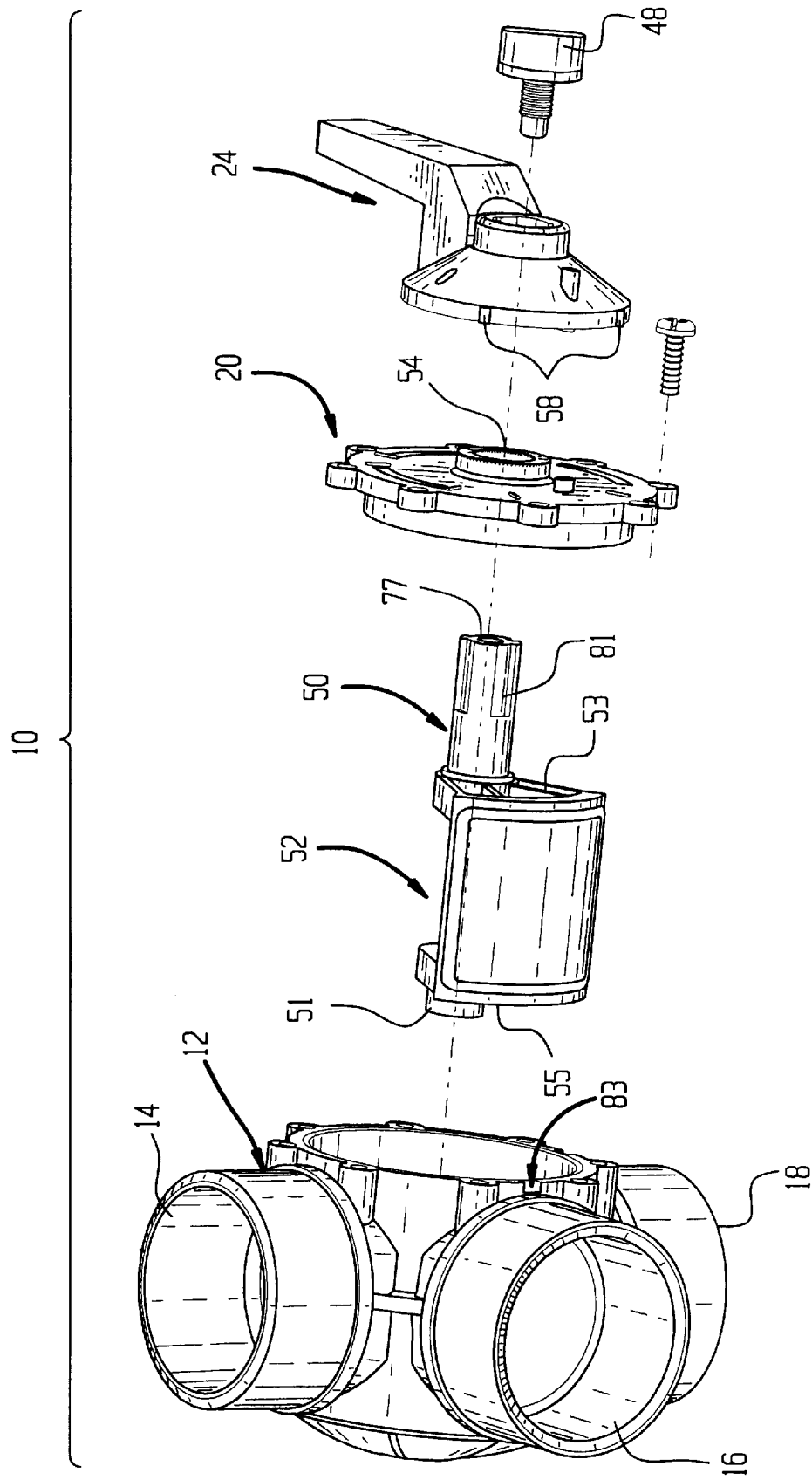
FIG. 2 is an exploded perspective view of the valve of FIG. 1.

FIGS. 1 and 2 show a multiport plug valve 10 having a selectable port exclusion feature. The valve body 12 has a plurality of ports 14, 16, 18 which may be connected to fluid conduits or pipes, e.g., in connecting a pump and a filter to a swimming pool. While three ports are shown, the present invention could be utilized in making a valve with any number of ports. A cover plate 20 attaches to the open end of the valve body 12 by a plurality of screws or other fasteners such as bolts or by a clamping arrangement. The cover plate 20 may also be affixed to the body 12 by rivets or plastic welding. A handle assembly 24 is provided for positioning the internal key 52 of the valve 10. The key 52 is an arcuate member having an extent sufficient to plug or block one of the ports 14, 16 or 18. The key 52 is supported on a pair of webs 53, 55 which rotate an opposing aligned shafts 50, 51. The body 12 has an internal radius closely approximating the radius from the axis of the key shafts 50, 51 to the face of the key 52. The key shaft 50 is splined or cross drilled for affixing the handle assembly 24 thereto. When the handle assembly 24 is affixed to the key shaft 50, rotation of the handle assembly 24 repositions the key 52 within the valve body 12 to selectively occlude or block one of the ports 14, 16, 18. The valve body 12, the ports 14, 16, and 18, the key 52 and the cover plate 20 are to a large extent conventional and known in the art.

As noted above, valves of this type find application as diverters for directing a fluid flow entering at one port to another of the ports provided. In that application, it is desirable to be able to exclude the inlet port from closure due to the fact that fluid entering the inlet port is frequently under pressure, e.g., due to a pump which could be damaged or overloaded if the inlet port is closed. As noted above, prior art valves have incorporated stops to prevent a selected port from being closed. Prior art valves, however, either have permanent stops or require disassembly of the valve in order to move the stops to the selected port.

Figure 3:
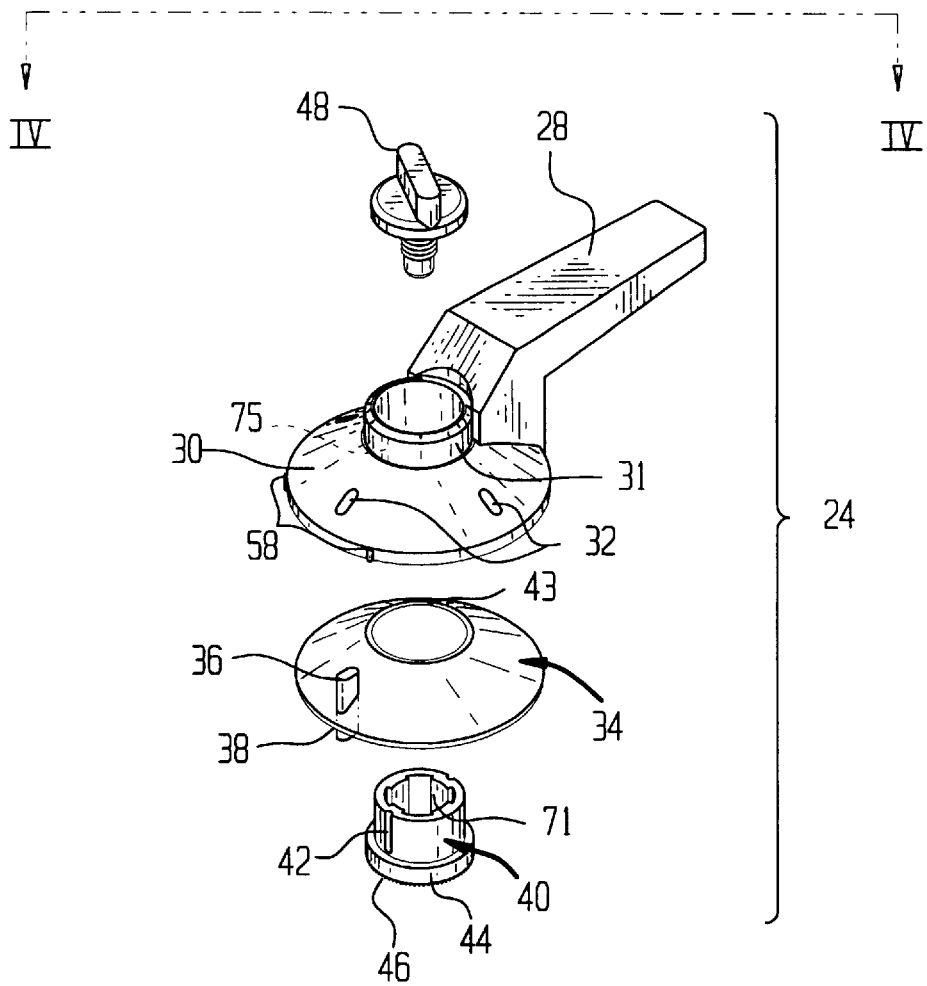
FIG. 3 is an exploded side view of the valve handle assembly of FIG. 2.
Figure 4:
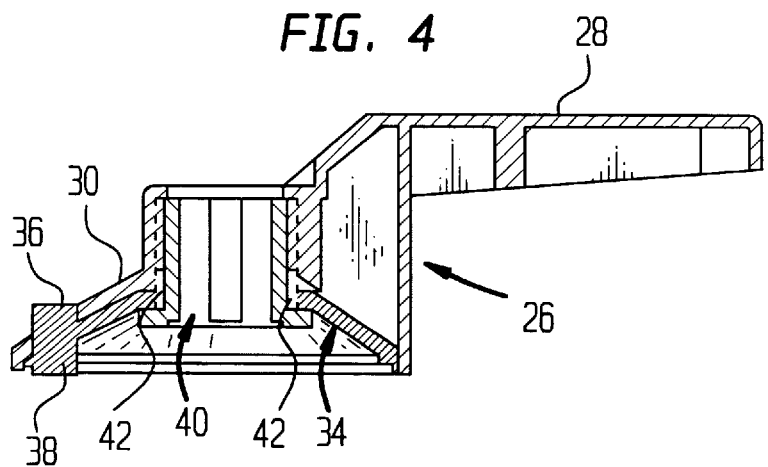
FIG. 4 is a cross-sectional view, taken along section line IV—IV, of the handle assembly shown in 3.
Figure 5:
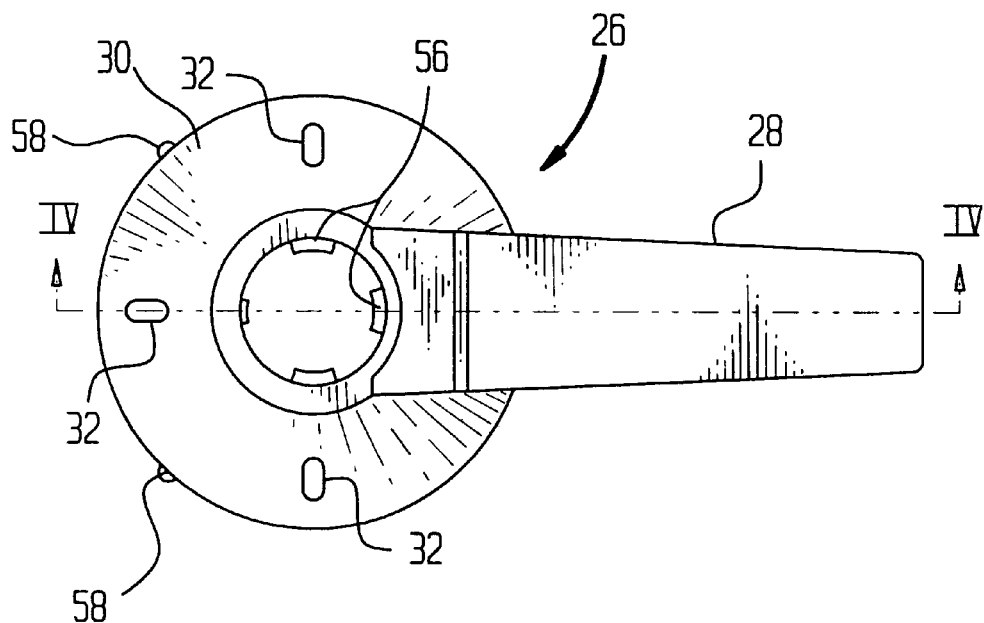
FIG. 5 is a top view of the handle assembly of FIG. 4.

Referring to FIGS. 3–5, the present invention overcomes the difficulties associated with prior art by means of the handle assembly 24 which can assume one of three states for excluding a selected one of the three ports shown in FIG. 1. Port selection for exclusion provided by the handle assembly 24 of the present invention does not require the cover plate 20 to be disassembled from the body 12. Instead, the handle assembly 24 itself can be adjusted without disturbing the cover plate 20. The handle assembly 24 includes an upper portion 26 having a hand grip 28 and an apertured disk portion 30 extending from a central mounting sleeve 31. The apertured disk portion 30 in the embodiment shown in FIGS. 3 and 4 is a tapered flange having a plurality of tab apertures 32. A clamp screw 48 extends through the sleeve 31 and secures the handle assembly 24 to the shaft 50. The tab apertures 32 are located at the nine, twelve and three o'clock positions with the handle 28 at six o'clock. An index disk 34 has a tab 36 extending from an upper surface thereof and a stop 38 depending from the bottom surface at the same approximate angular position as the tab 36. The stop 38 could be positioned at any angular position on the bottom surface of the index disk 34 other than directly below the tab 36 and the invention could still be practiced. The tab 36 may be inserted into any of the plural tab apertures 32 with the index disk 34 being coaxially received within a mating hollow in the disk portion 30. The index disk 34 may snap-fit into disk portion 30. A splined bushing 40 has an internal splined area 71 adapted to mate with splined shaft 50, thereby orienting the splined bushing 40 in a specific orientation relative to the shaft 50. The splined bushing 40 has at least one external keyway 42 which mates with at least one key 75 projecting from the interior of the sleeve 31 to establish the relative orientations of the handle 28 to the shaft 50 and key 52.

The bushing 40 has a lower flange 44 which abuts against a mating area of the index disk 34 proximate to the inner aperture 43, such that when the clamp screw 48 is threaded into a threaded aperture 77 (see FIG. 2) provided in the shaft 50, the handle assembly 24 is clamped together. When the clamp screw 48 is fully tightened, a plurality of teeth 46 on the bottom surface of the bushing 40 engage mating teeth 79 provided on the upper toothed surface of a collar 54 on the cover plate 20 (see FIG. 6), locking the handle in a selected position.

As shown in FIG. 4, a pair of keyways 42 may be provided to prevent rotation of the bushing 40 relative to the handle 28. FIG. 4 also shows that the splined bushing 40 inserts through the inner aperture 43 of the index disk 34 capturing the index disk 34 between the apertured disk portion 30 and the flange 44 when the splined bushing is fully home in the handle 28. The insertion of the tab 36 in one of the tab apertures 32 retains the depending stop 38 at a fixed angular orientation relative to the handle 28, and when the handle assembly 26 is installed on the splined shaft 50, relative to the key 52. To change the orientation of the stop 38, the bushing 40 is withdrawn from the handle assembly 26 to the extent necessary for the tab 36 to be disengaged from the associated tab aperture 32. The index disk 34 may then be rotated to permit the insertion of the tab 36 into another of the tab apertures 32 whereupon the bushing 40 can be pressed home in the handle assembly 26 and the assembly installed on the splined shaft 50.

With particular reference to FIG. 5, the spline teeth 56 are asymmetrical and match a similar asymmetrical pattern of the spline grooves 81 provided on shaft 50 (see FIG. 2). In this manner, the relative positions of the splined bushing 40, the index disk 34 and the key 52 are determined. The handle assembly 24 is reconfigured to exclude another selected port by repositioning the index disk 34 relative to the upper portion 26 of the handle assembly 24. The foregoing asymmetry in the shaft splines 81 and mating splines 56 of the bushing 40 is not required for the operation of the present invention, but does reduce the number of ways the handle assembly 24 may be placed on the shaft, thus simplifying operation of the valve 10 for the user. FIG. 5 shows that the disk portion 30 of the handle assembly 24 may be provided with key position indicators 58 which, in the embodiment depicted, are raised areas along the periphery of the disk portion 30. Any indicia, such as labels, embossments or reliefs in the surface could be used to indicate the position of the key 52.

Figure 6:
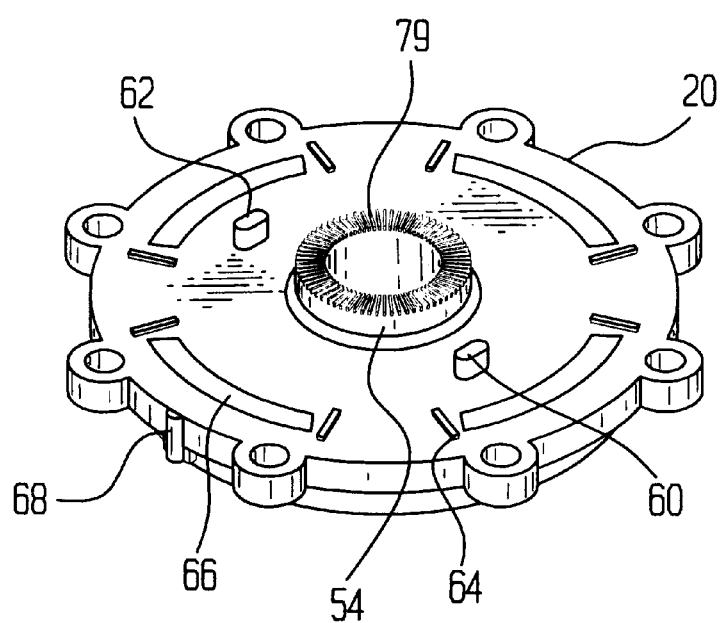
FIG. 6 is a perspective view of a cover plate for the valve of FIG. 1.

FIG. 6 shows that the cover plate 20 is provided with a pair of stops 60 and 62 against which the stop 38 impinges for excluding a selected port. FIG. 6 also shows that indicia 64, 66 may be employed on the cover plate 20 to show port alignment with the key 52, i.e., through the alignment of key position indicators 58 with indicia 64. Indicia 66 may bear some indication of port identity such as "input". A cover orientation tab 68 depends from a lower edge of the cover plate 20 and is received in a mating recess 83 provided in the body 12 of the valve 10. In this manner, the cover plate 20 is received on the body 12 in only one position and the mounting of the cover plate 20 on the body 12 is therefore asymmetrical. The number of tabs 68 and recesses 83 can be varied, provided the desired asymmetrical relationship is maintained. It should be noted that the stops 60 and 62 are asymmetrically placed to one side of the cover plate 20. Accordingly, the unique assembly orientation required by the asymmetry of the tab 68 and recess 83 facilitates and simplifies conveying operating instructions to the user.

FIGS. 7–9 illustrate diagrammatically the operation of the present invention. More particularly, it can be seen that the tab 36 may be inserted into any one of three apertures 32 in the disk portion 30. By varying the aperture 32 in which the tab 36 is inserted, one can configure the valve for exclusion of one of each of the ports 14, 16, 18. In FIG. 7, port 16 is assigned to be the inlet port and is excluded from being blocked by the key 52. As can be appreciated, tab 36 is inserted into aperture 32 at the twelve o'clock position. In the embodiment shown, the stop 38 (not visible in FIGS. 7–9) depends from the index disk 34 directly below the tab 36. As such, the handle assembly 24 could be rotated to occlude ports 14 and 18, but the depending stop 38 would encounter stop 60, if rotated counterclockwise fully, and stop 62, if rotated clockwise fully, thereby preventing the key 52 from passing beyond ports 14 and 18 to block port 16. In FIG. 8, port 14 is the inlet port. To achieve exclusion of port 14, the tab 36 is inserted into the aperture 32 of the disk portion 30 which is in the nine o'clock position. In FIG. 9, port 18 is blocked by inserting the tab 36 in the aperture 32 occupying the three o'clock position.

It should be understood that the embodiments described herein are merely exemplary and that a person skilled in the art may make many variations and modifications without departing from the spirit and scope of the invention as defined herein. For example, while a fixed key 36 projecting from an index disk 34 is shown herein, one can appreciate that a removable key which is insertable into a plurality of apertures provided on the index disk 34 would accomplish the same objective. For example, the key could be threaded into one of a plurality of mating threaded apertures on the index disk 34. As another alternative, one or more apertures could be provided in the disk portion 30 of the handle assembly 24 so that a selective alignment between a single aperture in the disk portion 30 and one of a plurality of holes in the index disk 34 could be aligned with a removable peg.

While the relative orientation between the disk portion 30 and the index disk 34 has been shown to be established by the insertion of tab 36 into aperture 32, other means for releasably fixing the relative orientation of the handle grip 28 and an element affixed to the shaft 50 could be readily achieved by one of normal skill in the art. For example, the adjacent surfaces of the disk portion 30 and the index disk 34 could be roughened or provided with teeth, such that upon clamping or pressing the two elements together by the action of the clamp screw 48, the two elements could be fixed relative to one another. Relative orientation could be achieved by a threaded member extending from the upper surface of the index disk 34 and passing through an elongated arcuate slot provided in the disk portion 30, which slot would extend approximately one hundred and eighty degrees around the disk portion 30. A wing nut received on the threaded member could clamp the disk portion 30 to the index disk 34 at a desired relative orientation. All the foregoing are intended to by encompassed by the teachings of the present application. Accordingly, all such variations and modifications are intended to be included within the scope of the invention as defined in the appended claims.

What is claimed is:

1. A handle for positioning a rotatable shaft extending from a housing, comprising:
    a hub releasably coupled to the shaft;
    a handgrip portion extending from said hub to facilitate applying manual torque to turn the shaft; and
    an adjustable stop releasably coupled to said hub so as to rotate conjointly therewith, but being rotatable independently of the shaft when uncoupled from said hub, said adjustable stop capable of assuming a plurality of angular orientations relative to said handgrip portion and having at least one projection sized and shaped so as to contact another stop located on the housing at at least one point in the rotary travel of said handle to limit the range of motion of the shaft, said adjustable stop having an engagement tab extending from a first surface thereof, said at least one projection extending from a second surface of said adjustable stop, said hub having a plurality of openings for receiving said engagement tab, and said engagement tab being insertable into one of said plurality of openings when said adjustable stop is coupled to said hub such that said engagement tab prevents rotation of said adjustable stop relative to said hub when coupled thereto.

2. The handle of claim 1, wherein said handle is removably retained on the shaft by a threaded member, said adjustable stop being held in coupled engagement with said hub by said threaded member when tightened, with said adjustable stop subject to uncoupling from said hub when said threaded member is untightened.

3. The handle of claim 2, wherein said handle has an outer surface area with a rough surface texture that engages a rough surface texture on the housing to restrain rotation of said handle relative to the housing when said threaded member is tightened.

4. The handle of claim 3, wherein said rough surface texture of said handle includes a plurality of teeth that interdigitate with mating teeth on the housing when said threaded member is tightened.

5. The handle of claim 1, further including a bushing inserted between said hub and the shaft, said bushing having a flange at one end thereof and having an axial opening that is complementary to the shape of the shaft such that said bushing rotates conjointly with the shaft, said bushing having an exterior peripheral shape that is complementary to an opening in said hub such that said bushing rotates conjointly with said hub when said bushing is inserted into said hub opening, said bushing being insertable through a central opening in said adjustable stop member and capturing said adjustable stop member between said flange and said hub.

6. The handle of claim 5, wherein said bushing is keyed to the shaft and said hub is keyed to said bushing.

7. The handle of claim 1, wherein said adjustable stop is received in a complementarily shaped hollow in said hub in snap-fit relationship.

8. A diverter valve, comprising:
    a cup-shaped substantially cylindrical body having a side;
    at least three ports extending from the side of said body, each communicating with a hollow in said body;
    a disk-shaped top held in sealing engagement with said body;
    a plug rotatably positioned within said body and sealing against said cylindrical body for closing a selected one of said at least three ports, a portion of said plug extending through said top to permit said plug to be turned;
    a stop extending from a surface of said top;
    a handle coupled to said portion of said plug, said handle having a hub releasably coupled to said portion of said plug and a handgrip portion extending from said hub to facilitate applying manual torque to turn said plug; and
    stop means provided on said handle for limiting the rotation of said plug to prevent the closure of a selected one of said at least three ports, said stop means including an adjustable stop releasably coupled to said hub so as to rotate conjointly therewith, but being rotatable independently of said portion of said plug when uncoupled from said hub, said adjustable stop capable of assuming a plurality of angular orientations relative to said handgrip portion and having at least one projection sized and shaped so as to contact said stop on said top at at least one point in the rotary travel of said handle to limit the range of motion of said plug, said adjustable stop having an engagement tab extending from a first surface thereof, said at least one projection extending from a second surface of said adjustable stop, said hub having a plurality of openings for receiving said engagement tab, and said engagement tab being insertable into one of said plurality of openings when said adjustable stop is coupled to said hub such that said engagement tab prevents rotation of said adjustable stop relative to said hub when coupled thereto.

9. A diverter valve, comprising:
    a cup-shaped substantially cylindrical body having a side;
    at least three ports extending from the side of said body, each communicating with a hollow in said body;
    a disk-shaped top held in sealing engagement with said body;
    a plug rotatably positioned within said body and sealing against said cylindrical body for closing a selected one of said at least three ports, a portion of said plug extending through said top to permit said plug to be turned; and
    a handle coupled to said portion of said plug, said handle having a hub, a handgrip portion extending from said hub to facilitate applying manual torque to turn said handle, and an adjustable stop releasably coupled to said hub so as to rotate conjointly therewith, said adjustable stop capable of assuming a plurality of angular orientations relative to said handgrip portion, and having at least one projection sized and shaped so as to contact another stop projecting from said valve at at least one point in the rotary travel of said handle to limit the range of motion of said plug and thereby prevent the closure of a selected one of said at least three ports.

10. A diverter valve according to claim 9, wherein said adjustable stop has an engagement tab extending from a first surface thereof, said at least one projection extending from a second surface of said adjustable stop, said hub having a plurality of openings for receiving said engagement tab, and said engagement tab being insertable into one of said plurality of openings when said adjustable stop is coupled to said hub such that said engagement tab prevents rotation of said adjustable stop relative to said hub when coupled thereto.

* * * * *